Figure 1:
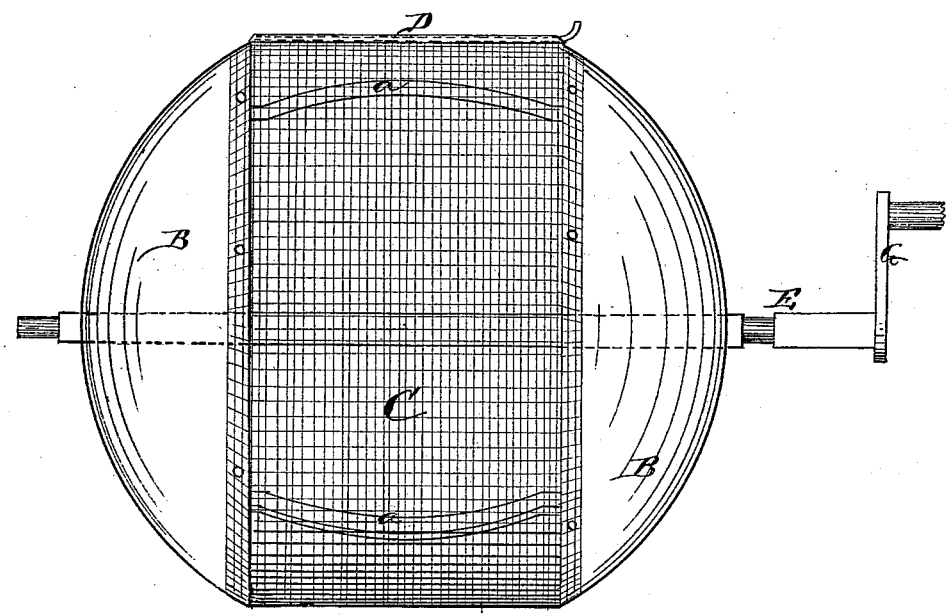

2 Sheets--Sheet 1.

GEORGE W. DODSON.
Coffee-Roaster.

No. 126,037.    Patented April 23, 1872.

Witnesses:

Inventor
G. W. Dodson.
Attorneys.

2 Sheets--Sheet 2.
GEORGE W. DODSON.
Coffee-Roaster.
No. 126,037. Patented April 23, 1872.
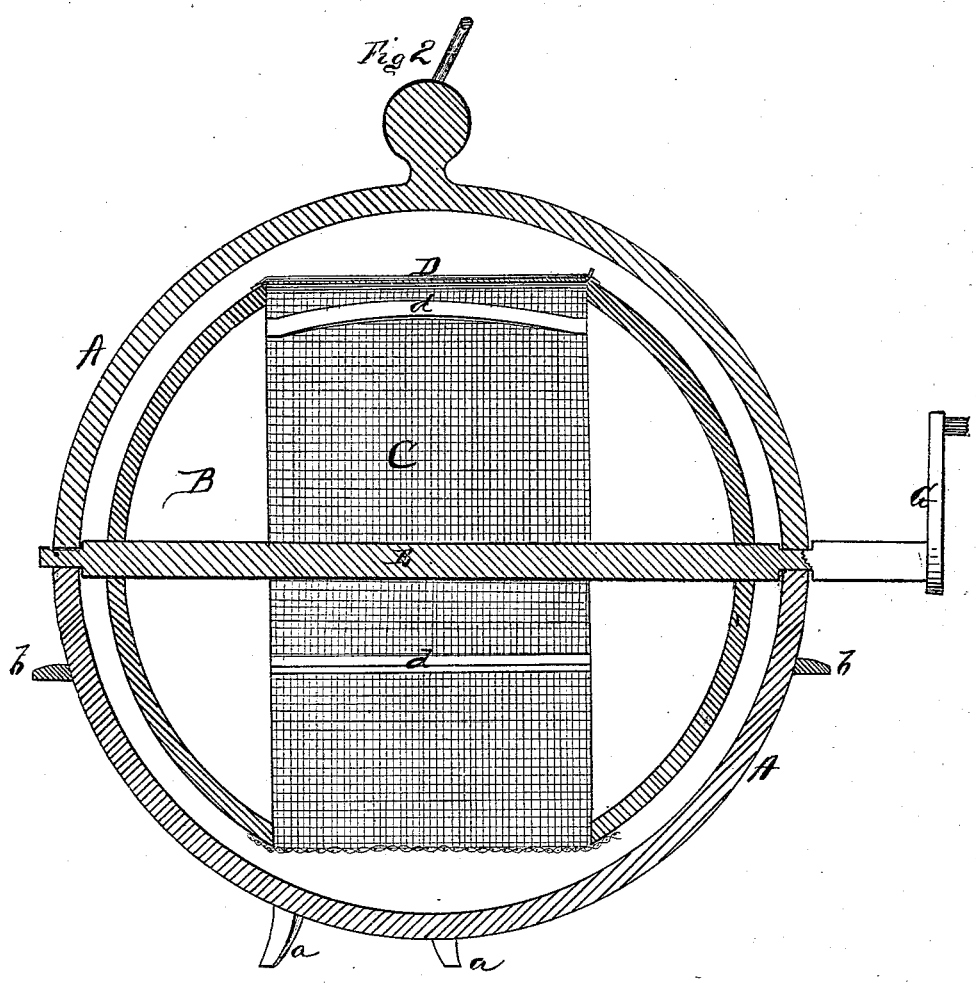
Witnesses: Inventor

UNITED STATES PATENT OFFICE.

GEORGE W. DODSON, OF MITCHELL, INDIANA.

IMPROVEMENT IN COFFEE-ROASTERS.

Specification forming part of Letters Patent No. 126,037, dated April 23, 1872.

*To all whom it may concern:*

Be it known that I, GEORGE W. DODSON, of Mitchell, in the county of Lawrence and in the State of Indiana, have invented certain new and useful Improvements in Coffee-Roaster; and do hereby declare that the following is a full, clear, and exact description thereof, reference being had to the accompanying drawing and to the letters of reference marked thereon making a part of this specification.

The nature of my invention consists in the construction and arrangement of a "Coffee-Roaster," as will be hereinafter more fully set forth.

In order to enable others skilled in the art to which my invention appertains to make and use the same, I will now proceed to describe its construction and operation, referring to the annexed drawing, in which—

Figure 1 is a side view of the interior roasting-globe, and Fig. 2. is a vertical section of my entire roaster.

My coffee-roaster is made of an exterior globe, A, and an interior globe, B. The exterior globe A is cast in two pieces, forming a top and bottom, the bottom part being provided with feet $a\ a$, and also with a circumferential flange, $b$, so that it can be placed in any stove hole, and rest upon the top of the stove. The interior globe B, consists of two spherical heads or end pieces connected by ribs $d\ d$, and having a wire-screen, C, between them around the entire circumference, a door, D, being formed in said screen. A shaft, E, passes through the center of this interior globe, and rests in bearings formed in the joint between the two parts of the exterior globe A. This shaft has upon one end a crank, G, by means of which it is turned.

The coffee to be roasted is put in the interior globe B through the door D, and this globe placed in the exterior globe A. This exterior globe forms a hot-air chamber around the globe containing the coffee, which is kept continually revolving. The screen C of the interior globe cleans the coffee from all chaff and dust in the same.

Having thus fully described my invention, what I claim as new, and desire to secure by Letters Patent, is—

The coffee-roaster described, consisting of an outer and an inner sphere, A B, the outer sphere A, being bisected at its center, and both sections rabbeted around their circumferences, the lower section having side lugs $b\ b$ and legs $a\ a$, and the inner sphere having screen C, door $d$, and operating-shaft E, all as shown and described.

In testimony that I claim the foregoing I have hereunto set my hand this 13th day of February, 1872.

G. W. DODSON.

Witnesses:
MARTIN D. CLINE,
FRANK T. WOODFORD.